Patented Jan. 14, 1936

2,028,012

UNITED STATES PATENT OFFICE 2,028,012

PROCESS FOR THE PREPARATION OF ESTERS OF UNSATURATED ACIDS

Ebenezer Emmet Reid, Baltimore, Md., assignor to E. I. du Pont de Nemours & Company, Wilmington, Del., a corporation of Delaware No Drawing. Application October 21, 1933, Serial No. 694,640

15 Claims. (Cl. 260—106)

This invention relates to a process for the preparation of esters of the unsaturated monocarboxylic aliphatic organic acids and more particularly to the preparation of the methyl ester of methacrylic acid (alpha-methyl acrylic acid) from phosgene and propylene.

An object of the present invention is to provide a process for the preparation of the ester of methacrylic acid. Another object of the present invention is to provide a new and improved process for the interaction of phosgene with propylene to obtain betachlorisobutyryl chloride. Another object of the invention is to provide a process for the preparation of the methyl ester of methacrylic acid including the steps of preparing betachlorisobutyryl chloride by the interaction of phosgene with propylene, the methylation of betachlorisobutyryl chloride by interaction with methanol to give methyl betachlorisobutyrate, and finally the dehydrohalogenation of the methyl betachlorisobutyrate to give the methyl ester of methyl acrylic acid. Other objects and advantages will hereinafter appear.

According to the present invention the esters of methacrylic acid may be obtained in the following manner. Phosgene, or other carbonyl halide, is reacted with propylene under conditions which will be more fully particularized hereinafter, to obtain the betachlorisobutyryl chloride. This halogenated acyl chloride is subsequently converted, by reaction with a mono- or polyhydroxy alcohol, such as the aliphatic alcohols, methyl, ethyl, propyl, etc., ethylene glycol, glycerine, etc., the aromatic alcohols, cyclic alcohols, and the ether alcohols, to a betachlorisobutyrate, which ester is then dehydrohalogenated to the ester of methyl acrylic acid. While I prefer, generally to prepare the ester in this manner, alternate methods, in some instances, may be employed. The betachlorisobutyryl chloride in lieu of direct treatment with the alcohol may be first hydrated to betachlorisobutyric acid and the acid then directly esterified with the alcohol to give the ester, or dehydrohalogenated to methyl acrylyl chloride and subsequently esterified. I prefer, however, the first method as it not only eliminates processing costs of the extra steps, but likewise substitutes a double decomposition reaction in the liquid phase with one gaseous product which can readily be removed, for an equilibrium esterification. Consequently the direct esterification of the acyl halide can be driven to completion with greater ease. No free chlorine is employed in my process and as a result serious corrosion difficulties are minimized, the only important by-product resulting from the normal reaction being hydrogen chloride gas, which may be readily eliminated; other advantages of my process include substantially no liquid diluents as water would be formed, and due to the dry conditions under which the reaction is conducted, the serious corrosion difficulties, which are present in processes now employed for the preparation of this ester, would not be encountered.

I shall now describe an example illustrating my process which, of course, will be understood to limit in no way the operating conditions, equivalents, or scope thereof.

Betachlorisobutyryl chloride is continuously synthesized by passing phosgene and propylene in a molal ratio of 1 to 1 into an autoclave containing an initial quantity of chlorisobutyryl chloride in which 2–15% of an aluminum chloride catalyst is dissolved; some betachlor-normal-butyryl chloride may likewise be obtained. The product is drained off periodically and more catalyst added to the residue in order to maintain the catalyst within the percentage range given. The reaction is conducted at temperatures of 30–100° C. and under pressures of 10–40 atmospheres. The acid chloride is then treated under atmospheric pressure and approximately room temperature with an equal molal proportion of methanol, calculated on the mols of propylene originally employed. After esterification has gone substantially to completion, the reactants are heated in order to drive off the last of the hydrogen chloride. The resulting methyl betachlorisobutyrate is then dehydrohalogenated by treating with alcoholic caustic soda at temperatures below 70° C., or dehydrohalogenating in the presence of a suitable catalyst to methyl methacrylate by known methods. The glycerol ester of unsaturated acids will be obtained by treating the betachlorisobutyryl chloride with glycerine in similar manner, the glycol ester by treating with glycol. When esterifying with the polyhydric alcohols, it is preferable to conduct this step in the presence of organic or inorganic bases as pyridine, soda ash, and the like, to absorb the hydrochloric acid formed. In lieu of esterifying the betachlorisobutyryl chloride and subsequently dehydrohalogenating as directed in the example the betachlorisobutyryl chloride may first be dehydrohalogenated to methacrylyl chloride which in monomeric or polymeric form may then be reacted with the alcohol. In case the monomeric acid chloride is reacted with alcohols, it may be of advantage to have present a material capable of reacting with hydrogen chloride such as the organic or inorganic bases listed above.

A number of catalysts may be employed for catalyzing the reaction between the phosgene and propylene to the betachlorisobutyryl chloride; catalysts such as the chlorides of aluminum, iron, zinc, bismuth, and antimony, stannous and stannic chloride, boron fluoride, and equivalent condensation catalysts are well adapted for this reaction. In many instances also these same catalysts may be used in the dehydrohalogenation of the methyl betachlorisobutyrate to methyl methacrylate. The catalyst, therefore, need not, in certain instances, be removed from the betachlorisobutyl chloride, but may be left during the methylation and will then be effective as a dehydrohalogenation catalyst, in the final step of my process to aid in the dehydrohalogenation of the methyl betachlorisobutyrate to methyl methacrylate. Because of the dehydrohalogenating ability of these catalysts some dechlorination of the betachlorisobutyryl chloride, under certain conditions of the reaction, may be effected during the first step of my process.

The phosgene and propylene may likewise be brought together in the vapor phase under substantially the same conditions of gas ratio, temperature, and pressure as indicated in the example. Activated charcoal, promoted or not with iron group halides, i. e. iron, nickel, or cobalt chloride, silica, and alumina gels, are suitable catalysts for the reaction in this phase.

From a consideration of the above specification it will be realized that any modification or improvement in the process described will come within the scope of the invention without sacrificing any of its advantages.

I claim:

1. A process for the preparation of an ester of methacrylic acid which comprises reacting phosgene and propylene in the presence of a condensation catalyst, esterifying the resulting betachlorisobutyryl chloride, and subsequently dehydrohalogenating the esterified and halogenated isobutyrate to give an ester of methacrylic acid.

2. A process for the preparation of an alkyl ester of methacrylic acid which comprises reacting phosgene with propylene, in the presence of a condensation catalyst, esterifying the acyl chloride thus obtained with an aliphatic alcohol, and finally dehydrohalogenating the esterified product.

3. A process for the preparation of a methacrylate of a polyhydroxy aliphatic alcohol which comprises reacting phosgene with propylene, in the presence of a condensation catalyst, esterifying the acyl chloride thus obtained with a polyhydroxy aliphatic alcohol, and finally dehydrohalogenating the esterified product.

4. A process for the preparation of the methyl ester of methacrylic acid which comprises reacting phosgene and propylene in the presence of a catalyst, esterifying with methanol the products obtained, and dehydrohalogenating the methyl ester to obtain methyl methacrylate.

5. A process for the preparation of an alkyl ester of methacrylic acid which comprises reacting phosgene and propylene in the presence of a catalyst, esterifying the acyl chloride thus obtained with a saturated aliphatic monohydroxy alcohol, and finally dehydrohalogenating the ester to the alkyl methacrylate.

6. A process for the preparation of glycerol methacrylate which comprises reacting phosgene with propylene, in the presence of a condensation catalyst, esterifying the acyl chloride thus obtained with glycerine, and finally dehydrohalogenating the esterified product.

7. A process for the preparation of glycol methacrylate which comprises reacting phosgene with propylene, in the presence of a condensation catalyst, esterifying the acyl chloride thus obtained with ethylene glycol, and finally dehydrohalogenating the esterified product.

8. In a process for the preparation of the esters of methacrylic acid the step which comprises reacting phosgene with propylene in the presence of a condensation catalyst.

9. In a process for the preparation of alkyl esters of methacrylic acid the step which comprises reacting phosgene and propylene in the presence of a condensation catalyst.

10. In a process for the preparation of the methyl ester of methacrylic acid the steps which comprise first preparing betachlorisobutyryl chloride by the interaction of phosgene with propylene in the presence of a condensation catalyst, esterifying the betachlorisobutyryl chloride by reaction with methanol to methyl betachlorisobutyrate, and finally dehydrohalogenating the methylbetachlorisobutyrate to methyl methacrylate.

11. In a process for the preparation of an alkyl ester of methacrylic acid the step which comprises passing phosgene and propylene into betachlorisobutyryl chloride containing a catalyst.

12. In a process for the preparation of an alkyl ester of methacrylic acid the step which comprises passing phosgene and propylene into liquid betachlorisobutyryl chloride containing 2–15% of a dehydrohalogenating catalyst.

13. A process for the preparation of alkyl esters of methacrylic acid which comprises passing phosgene and propylene into liquid betachlorisobutyryl chloride, reacting the betachlorisobutyryl chloride formed by this reaction with an aliphatic monohydroxy alcohol to obtain methylbetachlorisobutyrate, and finally dehydrohalogenating the methylbetachlorisobutyrate, the phosgene reaction, esterification reaction, and dehydrohalogenation reaction being conducted in the presence of a catalyst selected from the group consisting of a chloride of aluminum, iron, zinc, bismuth, antimony, stannous and stannic chloride, and boron fluoride.

14. A process for the preparation of an ester of methacrylic acid which comprises reacting phosgene and propylene in the presence of a metal halide catalyst, esterifying the resulting betachlorisobutyryl chloride, and subsequently dehydrohalogenating the esterified and halogenated isobutyrate to give an ester of methacrylic acid.

15. A process for the preparation of the methyl ester of methacrylic acid which comprises reacting phosgene and propylene in the presence of a metal halide catalyst, esterifying with methanol the product obtained, and dehydrohalogenating the methyl ester to obtain methyl methacrylate.

EBENEZER EMMET REID.